July 15, 1958     H. G. DOLL     2,842,961
FLOW MEASUREMENT IN WELLS
Filed Sept. 16, 1954     2 Sheets-Sheet 1

INVENTOR.
HENRI GEORGES DOLL
BY
HIS ATTORNEY

July 15, 1958

H. G. DOLL 2,842,961

FLOW MEASUREMENT IN WELLS

Filed Sept. 16, 1954

INVENTOR.
HENRI GEORGES DOLL
BY William R. Sherman
HIS ATTORNEY

United States Patent Office 2,842,961
Patented July 15, 1958

2,842,961

FLOW MEASUREMENT IN WELLS

Henri Georges Doll, Ridgefield, Conn., assignor, by mesne assignments, to Schlumberger Well Surveying Corporation, Houston, Tex., a corporation of Texas Application September 16, 1954, Serial No. 456,469

3 Claims. (Cl. 73—155)

The present invention relates to the measurement of fluid flow in a well or other extended flow passage and, more particularly, to a novel method and apparatus for positively measuring the flow of liquid in a well or flow passage without appreciably impeding such flow.

The rate of flow of liquid in an oil well established by the production of liquid from one or more formations or by lost circulation of liquid into one or more formations is of considerable significance in the exploitation of a well. A measure of this flow has commonly been sought by immersing a flow meter of the rotary vane type in the liquid and detecting the rate of rotation produced by the flow. The accuracy of these measurements is impaired, however, by the dependency of the vane rotation upon the viscosity and density of the liquid and the cross sectional area of the well. Also, a loss of sensitivity at low values of flow results from friction in the rotary vane bearings.

In the measurement of flow in producing wells, moreover, conventional flow meters, including the rotary vane type, cannot readily be sized for lowering through the usual production tubing of 2 to 2½ inches inside diameter and yet measure flow accurately within a casing therebeneath of about 7 to 12 inches inside diameter. Such capabilities, however, are becoming increasingly desirable with the introduction of completion techniques for placing a well in production with the tubing permanently set.

Accordingly, it is an object of this invention to provide a new and improved method and apparatus for accurately measuring the flow of liquid across a given cross section in a well or fluid passage in a manner overcoming the above-recited disadvantages of prior art devices.

It is another object of this invention to measure the flow of liquids substantially independently of the physical properties of such liquids and the cross sectional area of the well or passage without appreciably impeding the flow while measuring.

Yet another object of this invention is to obtain a measure of the flow of liquid across a given level in a producing oil well without requiring the removal of production tubing for access to the well.

These and other objects are attained by determining the rate at which fluid must be pumped across any given cross section in a well or passage to simulate its established rate of flow thereacross. More particularly, a slender, elongated housing is lowered into a well to a position across the level where the flow measurement is to be taken. The flowing liquid is then pumped through such housing until there ceases to be any flow across the given level outside the housing. By accomplishing a substantially complete diversion of the established flow through the action of a positive displacement pump, the pumping rate of such pump may be taken to indicate the established rate of flow at the given level.

Accordingly, provision is made for adjusting the rate of such pump until there is substantially a complete diversion of flow through the housing and thereupon obtaining an indication of the rate of the pump. To determine when the pumping rate equals the rate of flow being measured, a null flow device is disposed for response to any flow across the given level exterior to the housing. Representative types of null detectors are shown in the several embodiments.

The invention and others of its objects and advantages will be more clearly perceived from the following detailed description taken in conjunction with the drawings in which.

Figures 1, 6:
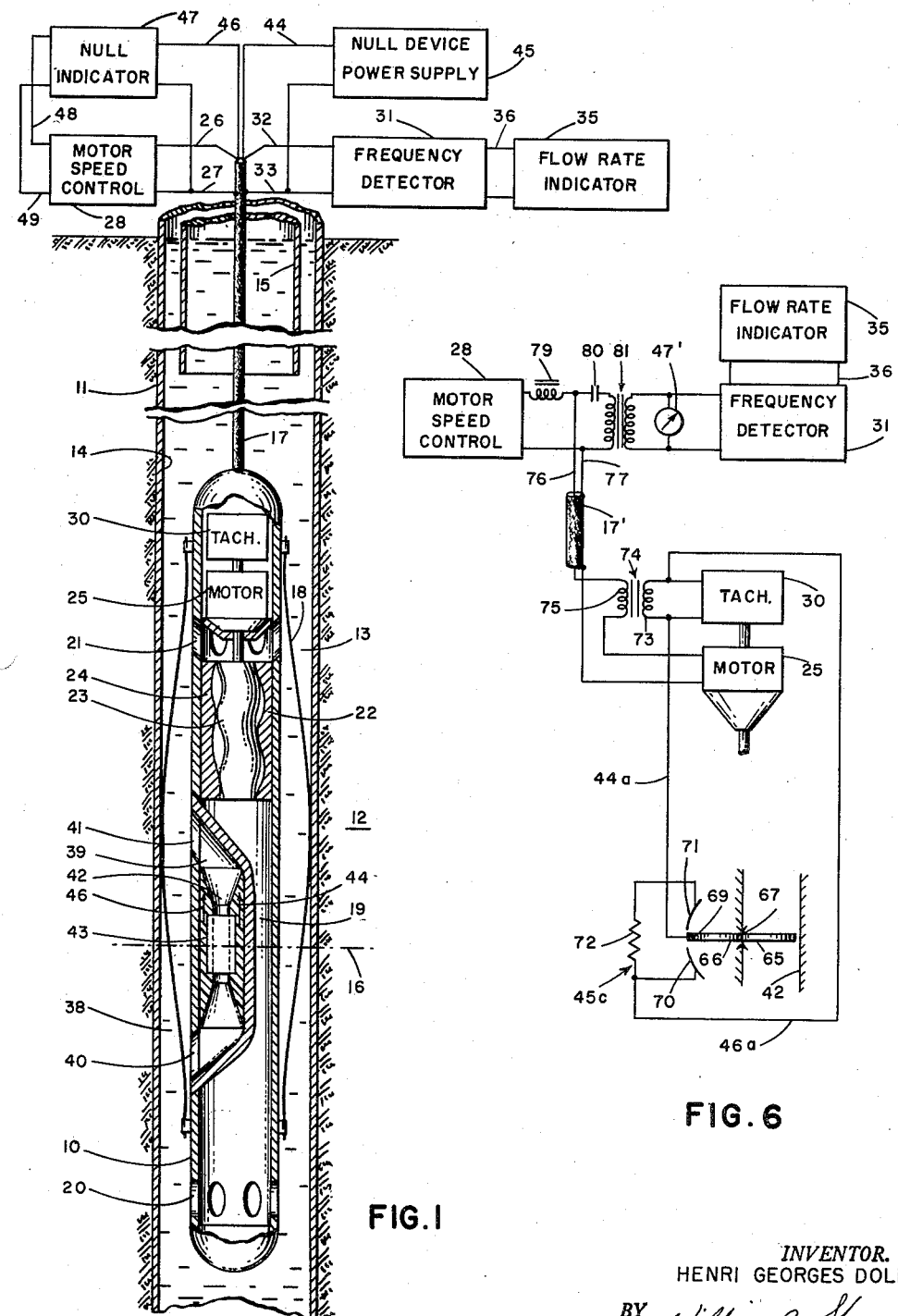
Fig. 1 is a schematic elevational view, partly cut away, of a flow meter positioned in a well for measuring the flow of liquid across a level.
Fig. 6 is a schematic diagram of a circuit employed with the null flow device of Fig. 5 in lieu of the circuit shown in Fig. 1.

In Fig. 1 a slender elongated cylindrical housing 10 is shown disposed in a well 11 extending through formations 12 and containing a liquid 13 such as a drilling fluid, oil, or an admixture of water with oil. The borehole 11 may be completed with the customary apparatus for controlling its production, including a casing 14 and a string of production tubing 15. For measurement of flow across a given level or transverse section 16 of the well 11, the housing 10 may be supported in the well by means of an armored electrical cable 17 carried on a conventional winch (not shown) at the earth's surface and may be centered by a plurality of bowed springs 18. For passage through the production tubing, the housing with its bowed springs 18 collapsed has an external diameter on the order of 2 inches.

A passage 19 extending longitudinally through the housing 10 across the given level 16 places inlet ports 20 and outlet ports 21, spaced longitudinally on opposite sides of level 16, in fluid communication with one another. Preferably, this passage 19 will have as ample a cross section as the available space within the housing will permit. To divert the pre-existing or established flow of liquid 13, a positive displacement pump 22 is disposed along the passageway 19 for pumping the liquid 13 interiorly of the housing through the passage 19 across the given level. Since a positive displacement pump may be defined as a pump which moves a calibrated volume of fluid in each pumping cycle, it will be apparent that a great many types of pumps are embraced within this definition.

Preferred is a progressing cavity pump employing a helical, rod-like rotor 23 rotatable in a complementary cavity of a stator 24. Such a pump, known commercially as the Moyno, is capable of reversibly pumping well liquids without pulsation and without appreciable dependency upon viscosity and density. The pump desirably will have a capacity sufficient to equal the highest rate of flow to be measured. Being of the positive displacement type, the pump 22 will have a pumping rate substantially proportional to the speed at which the rotor 23 is driven by motor 25 coupled thereto. By experimental tests, the volume of liquid discharged by the pump in each rotary cycle may be calibrated.

The pump motor 25 may be of any conventional type, either A. C. or D. C., although a D. C. motor is preferred for reasons explained hereafter. Conductor 26 extending up through the cable 17 and conductor 27 grounded through the conducting armor of the cable connect the motor 25 to a conventional motor speed control 28 for adjustably energizing the motor to drive the pump reversibly at varying, selectable speeds. As the measurements would normally be taken under static conditions, that is, with the housing 10 at a fixed depth in the well 11 and the flow of liquid 13 relatively constant, a simple manual-type of motor speed control may suffice. Where a continuous series of flow measurements along an interval is desired, the motor speed control 28 may be automatically actuated as hereafter described.

While the adjustment of the motor speed control 28 may give a more or less definite indication of the motor speed, a more exact measurement of speed may generally be obtained by a direct measurement, as by means of a tachometric generator 30 coupled directly to the motor 25. This tachometric generator 30 may be either of the A. C. or the D. C. type but the A. C. type is preferred which provides a signal varying in frequency in proportion to the speed measured. This varying frequency signal is supplied to a conventional frequency detector 31 of any suitable type by means of conductor 32 passing through the cable 17 and conductor 33 grounded through the armored sheath of the cable. As the frequency detector 31 is adapted to convert the varying frequency signal into an amplitude modulated signal, a reading of speed of the motor and hence of the pump may be obtained on a flow rate indicator 35 connected in the output circuit 36 of the frequency detector. This indicator 35, which may be of any conventional type responsive to the amplitude of an electric signal, may be calibrated to read in revolutions per minute or directly in suitable units of fluid flow through the pump 22. For a particular casing diameter, the calibration may, if desired, be in units of flow velocity.

In order that the reading on indicator 35 will represent the established rate of flow of the well liquid 13 at the level 16 intermediate the inlet and outlet ports 20, 21, it is necessary that the pump 22 be operated at a speed which will divert substantially all of this established flow through the interior passage 19 of the housing so that practically no liquid flows externally of the passage across the given level. Such condition will be reached when the well liquid in annular space 38 between the exterior of the housing 10 and the wall of the well 11 is substantially at a standstill. Although various means could be employed for the purpose of detecting the presence or absence of flow in this annular space 38, it is desirable that the flow detecting device be confinable within the profile of the housing and that it provide a very sensitive null flow indication as well as an indication of the direction of any flow through the annular space 38 in the absence of a complete diversion.

To this end, a flow measuring tube 39 within the housing 10 is placed in communication with the annular space 38 by means of an entry port 40 and an exit port 41 flush with the exterior of the housing 10. As the ports 40 and 41 are spaced apart longitudinally of the housing on either side of the level 16, any hydrokinetic forces productive of flow of the liquid 13 upwardly or downwardly in the annular space 38 will produce a similar flow through the tube. Any such flow through the tube 39 is increased in velocity through a throat or Venturi section 42 of the tube to augment the sensitivity of null flow detection. At such throat section is disposed a null flow device 43 which, when furnished electric power through conductors 44 and 33 from a power supply 45, will send a signal on conductors 46 and 27 to an indicator 47 showing the direction or absence of flow through the throat.

Since the purpose of the null flow device 43 and indicator 47 is to furnish a guide for the correct adjustment of the pumping speed for null flow in the annulus 38, any mode of indicating the sense of a needed correction and the occurrence of the correct speed will suffice. If desired, the indication may take the form of an output signal supplied by the null indicator 47 over conductors 48 and 49 to the motor speed control 28, where the motor speed control is arranged to respond automatically to such output signal to correct the motor speed. As a variety of motor speed controls having a servo-type response to a directional error signal are commercially available, the nature of the motor speed control 28 will be readily perceived from its functional relationships here described.

Figure 2:
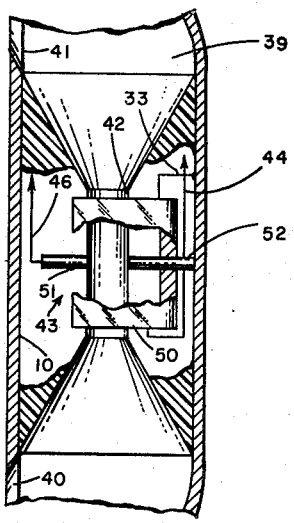
Fig. 2 is an enlarged fragmentary view of the flow meter of Fig. 1, illustrating an electromagnetic null flow device used therein.

Likewise, a variety of null flow devices exist which would be suitable for detecting the direction or absence of flow through the throat 42. In Fig. 2, for example, the null flow device 43 disposed across the throat 42 is constructed in accordance with the principles taught in Patent No. 2,149,847, issued March 7, 1939, to A. Kolin, for "Apparatus for Measuring Fluid Flow." While reference is made to this patent for a detailed description, the device 43 generally comprises an electromagnet 50 energized through conductors 44, 33 to establish a uniform magnetic field across throat 42. Aligned electrodes 51 and 52 extend transversely of the throat and of the established magnetic field, through the walls of the throat into contact with the liquid therein. With the electromagnet 50 energized by D. C. current, a D. C. voltage will be induced between electrodes 51 and 52 dependent upon the magnitude and sense of any fluid flow through the throat 42, assuming the well fluid 13 to be at least slightly conductive. The voltage across electrodes 51, 52 communicated to the null indicator 47 may be suitably balanced against a voltage adjustably developed therein, as by a battery connected across a slide wire potentiometer (not shown), so that a signal is derived which varies in polarity in accordance with the direction of fluid flow through the throat. For operation of this device 43, the throat 42 is preferably composed of a non-magnetic, non-conducting material such as a plastic.

In operation, the housing 10 may be introduced into the well 11 through production tubing 15 with the bowed centralizing springs 18 in their collapsed position. When the null flow device 43 is at the desired level 16 in the well, the pump motor 25 is energized by D. C. current accordingly as the null indicator 47 operating in response to an A. C. signal from the null device 43 shows well liquid to be flowing upwardly or downwardly across the level 16. If the flow is upward, for example, the motor would be energized in a direction to pump the well liquid 13 upwardly through the ports 20, up the passage 19 and out the ports 21. If the indication of flow were the reverse, motor 25 would be energized for operation in the opposite pumping direction.

The motor speed and hence the pumping rate is then varied until the null indicator 47 shows that a zero flow condition has been established in the throat 42. At such instant, the setting of the motor speed control 28 may be observed to provide a measure of the pumping rate of pump 22 and hence of the established rate of flow across the level 16. For a more accurate measure of the flow rate, however, the variable frequency signal derived from tachometer 30 is converted by the frequency detector 31 to an amplitude varying signal suitable for operating the flow rate indicator 35. Because the motor is supplied with D. C. current, errors in the indicator reading due to cable "cross talk" are avoided.

If desired, housing 10 may be moved slowly through a succession of levels in the well 11 with the motor speed adjusted manually or automatically to maintain a correct reading on the flow rate indicator. Where the flow rate indicator 35 has the form of a recording instrument, a record of the flow rate may be derived, graphically representing the variation in flow rate as a function of the depth of the housing 10 in the well.

It will be apparent, then, that either upward or downward flow of well liquids, or other liquids within a flow passage, may be measured directly in terms of the volume rate of flow without an intermediate determination of the velocity of flow or the cross section of the well or flow passage. By suitably spacing the inlet and outlet ports for the pump 22 upwardly and downwardly from the ports for the flow tube 39, the null flow device 43 may be isolated from any disturbances occasioned by the diversion of flow through the pump.

Figure 3:
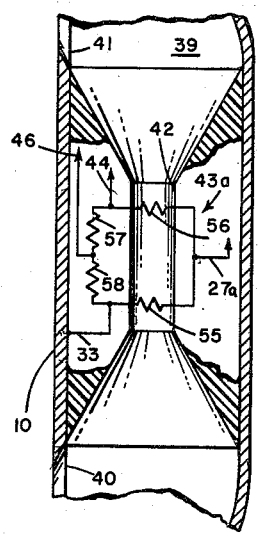
Figs. 3–5 are similar views of alternate forms of the null flow device of Fig. 2.

In lieu of an electromagnetic null flow device, a thermal-type device 43a shown in Fig. 3 may be employed. This device 43a comprises a bridge circuit having identically resistive filaments 55 and 56 connected in adjacent arms and extending across the throat 42 in contact with the well fluid 13. Identical resistors 57 and 58 are connected in the remaining arms of the bridge circuit diagonally opposite from filaments 55 and 56, respectively, and have preferably a low temperature coefficient relative to filaments 55, 58. To supply D. C. current from the power supply 45 to the bridge circuit, conductor 44 is connected between filament 56 and resistor 57, while the junction of filament 55 and resistor 58 is connected to the supply 45 by conductor 33 through the housing 10 and the cable armor. The null indicator 47 forms the measure diagonal of the bridge circuit by the connection of conductor 46 at the junction of resistors 57 and 58 and the connection afforded by a conductor 27a, in lieu of conductor 27, to the junction of filaments 55 and 56.

In operation, the filaments will be heated equally by direct current from the power supply 45 and hence may have identical resistances in the absence of any flow through the throat 42. However, in the presence of a flow, the filament which is downstream of the other will be heated to a higher temperature than the other by convection. Accordingly, the downstream filament will have a higher resistance than the upstream filament and will unbalance the bridge to give an indication on the null indicator 47 of the sense and magnitude of flow through the throat 42. In the manner previously described, the motor speed may then be adjusted in accordance with this indication to give the correct reading of flow rate on the indicator 35.

Figure 4:
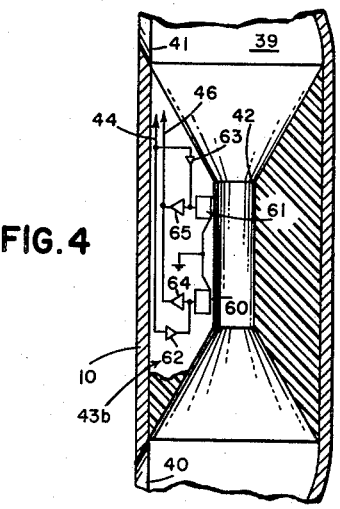

In Fig. 4 a null flow device 43b is shown operating upon an acoustic principle. While a variety of acoustic devices might be suited to this application, a good sensitivity is obtained with the electronic flow meter system described by H. P. Kalmus in The Review of Scientific Instruments, vol. 25, No. 3, March 1954, at pages 201–206. Reference is made to this article for details of construction. Broadly, however, the null flow device 43b comprises a pair of piezoelectric transducers 60, 61 acoustically coupled to the fluid within the throat 42 and spaced longitudinally therealong. The coupled faces of the transducers 60 and 61 are electrically grounded, while their opposite faces are alternately supplied with an A. C. signal through gated amplifiers 62 and 63 energized through conductor 44 by the power supply 45. In opposite alternation, the same non-coupled faces of the transducers 60, 61 are coupled through gated amplifiers 64, 65 to the null indicator 47. For proper response to this null flow device 43b, the null indicator 47 includes a phase meter tube and a comparison circuit (not shown) synchronized with the gating of the amplifiers 62, 63, 64, 65, so that the null indicator will show the magnitude and sense of any flow through the throat 42.

In operation, the transducer 60 may be operated as a sound transmitter during a first half cycle and as a sound receiver during a second half cycle, while transducer 61 is operated in the reverse sequence. In this event, the amplifiers 62 and 65 are gated on during the first half cycle, while the amplifiers 64 and 63 are gated on during the second half cycle. The transmitting and receiving functions of the transducers 60 and 61 may be reversed at a rate, for example, of 100 cycles per second. By using a plastic tube for the throat 42, a direct acoustic transmission path between the transducers 60 and 61 is avoided. Hence, by driving the transducers alternately at a frequency on the order of 100,000 cycles per second, an indication may be obtained from which the correct motor pumping speed can be derived.

Figure 5:
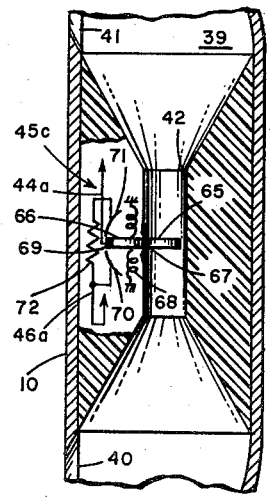

Yet another null flow device 45c dependent upon hydrokinetic pressures for its operation can be suitably employed. As shown in Fig. 5, a vane 65 is disposed athwart the throat 42 so as substantially to obstruct flow through the throat when in this normal position. The vane 65 is carried on an arm 66 extending through the wall of the throat 42 and pivotally mounted on an axis 67 tangent to the wall. Biasing springs 68 acting upon the arm 66 exert a light force thereupon tending to maintain it in the normal position.

On the free end of the arm 66 is carried a contact button 69 connecting with the conductor 44a and disposed to engage fixed contacts 70 or 71 upon upward or downward movement of the vane, respectively, under the influence of hydrokinetic forces. Across contacts 70 and 71 is connected a resistor 72, while contact 70 connects with conductor 46a.

As this null device 45c is particularly arranged so as to minimize the number of required cable conductors, a somewhat modified circuit arrangement shown in Fig. 6 is employed with it in lieu of the circuit of Fig. 1. However, the structural elements of the flow meter contained in the housing 10 may be arranged just as shown in Fig. 1. Referring now to Fig. 6, conductors 44a and 46a are seen to be connected across the output terminals of the tachometer 30 and thus across primary winding 73 of its output transformer 74. The secondary winding 75 of the transformer 74 is connected by conductor 76 in series with the pump motor 25, and conductor 77 provides a current return through the cable armor, so that both conductors 77 and 76 are led to the surface. Whereas a multiconductor cable 17 was employed in the embodiment of Fig. 1, a monoconductor cable 17' suffices for energization of the flow meter of Fig. 6.

As earlier stated, the motor 25 is preferably a D. C. type in order that its speed and direction may be governed by D. C. current supplied from the motor speed control 28. A choke coil 79 connected between the motor speed control and conductor 76 will pass such D. C. current, while offering a relatively high impedance to A. C. current. Through the transformer coupling between primary and secondary winding 73, 75, the variable frequency A. C. signal developed by the tachometric generator 30 is applied to conductors 76, 77 through a capacitor 80 at the surface thence to the primary winding of a transformer 81. Across the secondary winding of this transformer 81 is connected a null indicator 47' which may simply be an A. C. voltmeter. The output of the transformer is also coupled to the frequency detector 31 which provides an amplitude varying signal to the flow rate indicator 35, as was the case with the apparatus of Fig. 1.

In operation, an upward flow of fluid through the throat 42 will act against the vane 65 to move contact button 69 on arm 66 into electrical connection with contact 70, thereby short circuiting the tachometer 30 through conductors 44a and 46a. In such instance, zero A. C. voltage will be read on the meter 47', indicative of upward flow in the throat 42. Manually or automatically, as desired, the motor speed control 28 would then be adjusted to increase the upward pumping rate of pump 22 until a zero flow through the throat was obtained. Such zero flow would be evidenced by a reading on the meter 47' of the normal output voltage from the tachometer 30, since the conductors 44a and 46a would then be open circuited. At this time the reading of the flow rate indicator 35 gives the correct measure of the flow past the level 16.

A downward flow through the throat 42 would, on the other hand, produce a connection between button 69 and contact 71 placing resistor 72 in parallel across the primary winding 73 of the tachometer transformer 74. As the output of the tachometer would then be diminished, an intermediate reading of the meter 47' would be obtained.

It will be clear that the blocking capacitor 80 serves to prevent diversion of the motor current through the primary of the transformer 81, just as the choke 79 prevents diversion of the tachometer signal through the output circuit of the motor speed control 28. Because the tachometer signal in passing through the D. C. motor 25 will not adversely affect its operation and the D. C. and A. C. currents are separated at the surface to perform their respective functions, it is clear that the monoconductor cable 17' adequately serves as a transmission path between the housing and the earth's surface. The effective amplitude modulation of the tachometer signal in accordance with the direction or absence of flow through the throat 42 serves to convey this information to the surface, at the same time leaving the tachometer signal undisturbed when the flow rate indicator 35 is reading correctly.

Whereas the electromagnetic, thermal and acoustic null flow devices heretofore described have been derived from the prior art for a novel combination with the remainder of the flow meter described, the vane type flow device 45c provides a novel mode of flow measurement requiring only the monoconductor cable of the type commonly employed in wire line services of the oil industry.

Each of the null flow devices herein described is, of course, completely independent of the physical properties of the fluid in providing a null flow indication. Since each null flow device is disposed within the throat 42 through which only a minor portion of any fluid moving upwardly or downwardly in the annulus 38 passes, movement of fluid in the annulus is almost unobstructed even when the pump is not operating. Moreover, the flow meter housing itself no longer constitutes an obstruction when flow is being measured, since the pump maintains the established flow conditions above and below the housing which would have existed in the absence of the housing.

The invention is susceptible to various modifications, in addition to those described, including the use of an A. C. motor signal and a D. C. tachometer signal or other combinations of A. C. and D. C. signals or signals of different frequencies. In lieu of the null flow devices disclosed herein, a paddle driven by a motor with and against any flow of fluid in the annulus 38 might be employed, arranged in accordance with the teachings of copending application Serial Number 469,089, filed November 16, 1954, by Lebourg, for "Flow Meter" and assigned to the assignee hereof.

If desired, the flow meter of this invention could be combined with the apparatus of copending application Serial Number 430,149, filed May 17, 1954, by A. Blanchard, for "Well Logging" and assigned to the assignee hereof. Incorporating such apparatus with the pump and passage herein disclosed, a continuous record of the oil-to-water ratio may be secured along with the flow measurements. A conventional densitometer might also be incorporated in the housing 10 to provide further information concerning the well fluid at given levels in the well.

While the flow meter of this invention has been particularly described in connection with the measurement of flow in wells, its utility is not limited to this application but may readily be extended to a measurement of flow in pipes and conduits of various sorts.

Accordingly, it will be understood that the above-described embodiments of the invention are illustrative only and that modifications thereof will occur to those skilled in the art. Therefore, the invention is not to be limited to the specific method and apparatus disclosed herein but is to be defined by the appended claims.

I claim:

1. In apparatus for measuring the flow of liquid across a given level in an oil well, the combination comprising an elongated cylindrical housing having a diameter on the order of 2 inches and a passage longitudinally therethrough for disposition across a given level in a well, a positive displacement pump disposed along said passage for pumping liquid therethrough, means for generating a signal the frequency of which is proportional to the pumping rate of said pump, means for amplitude modulating said pumping rate signal in accordance with the direction of flow of liquid across the given level externally of said passage, means for adjusting said pumping rate in accordance with the amplitude modulations of said modulated signal, and means including a frequency detector for indicating said adjusted pumping rate when liquid flow across the given level is substantially at a standstill.

2. In apparatus for measuring the flow of liquid across a given level in a well, the combination comprising an elongated cylindrical housing having a passage longitudinally therethrough for disposition across a given level in a well, a positive displacement pump disposed along said passage for pumping liquid therethrough, means for producing a signal the frequency of which is proportional to the pumping rate of said pump, means for amplitude modulating said pumping rate signal in accordance with the flow of liquid across the given level externally of said passage, means for adjusting said pumping rate in accordance with the amplitude modulations of said modulated signal, and means responsive to the frequency of said pumping rate signal for indicating said adjusted pumping rate when liquid flow across the given level is substantially at a standstill.

3. In apparatus for measuring the flow of liquid across a given level in a well, the combination comprising an elongated cylindrical housing having a passage longitudinally therethrough for disposition across a given level in a well, a positive displacement pump disposed along said passage for pumping liquid therethrough, means for generating a signal the frequency of which is proportional to the pumping rate of said pump, a vane disposed across at least a portion of the given level externally of said passage, means responsive to the direction of movement of said vane under hydrokinetic pressure for amplitude modulating said pumping rate signal in accordance with the direction of flow of liquid across the given level externally of said passage, means for adjusting said pumping rate in accordance with the amplitude modulations of said modulated signal, and means responsive to said pumping rate signal for deriving indications of the rate of flow of said liquid across the given level.

References Cited in the file of this patent

UNITED STATES PATENTS

| | | |
|---|---|---|
| 2,329,386 | Brennan | Sept. 14, 1943 |
| 2,612,845 | Byram et al. | Oct. 7, 1952 |
| 2,652,720 | Piety | Sept. 22, 1953 |
| 2,686,618 | Mateer | Aug. 17, 1954 |
| 2,729,101 | Wiley | Jan. 3, 1956 |
| 2,729,102 | Worth | Jan. 3, 1956 |
| 2,741,916 | Wiley et al. | Apr. 17, 1956 |
| 2,741,917 | Piety | Apr. 17, 1956 |